United States Patent Office 3,341,159
Patented Sept. 12, 1967

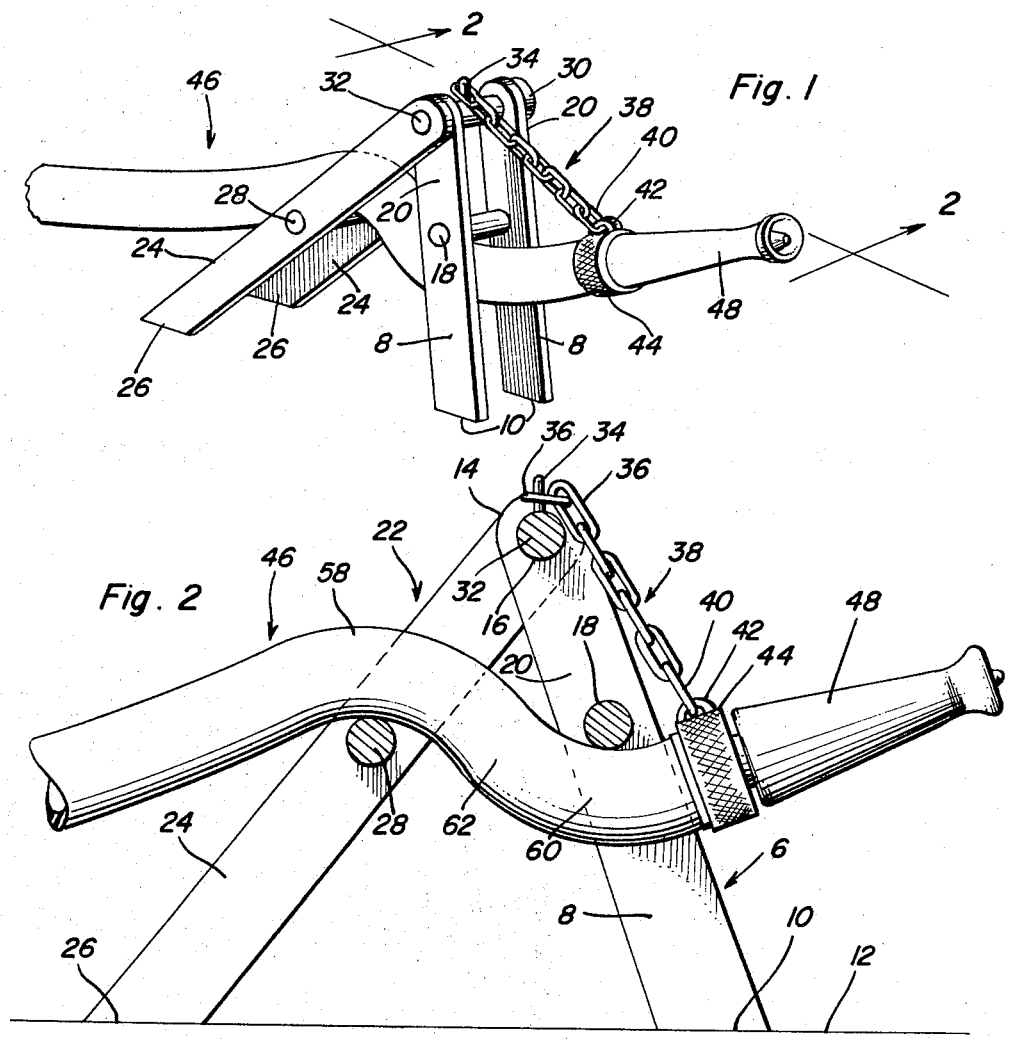
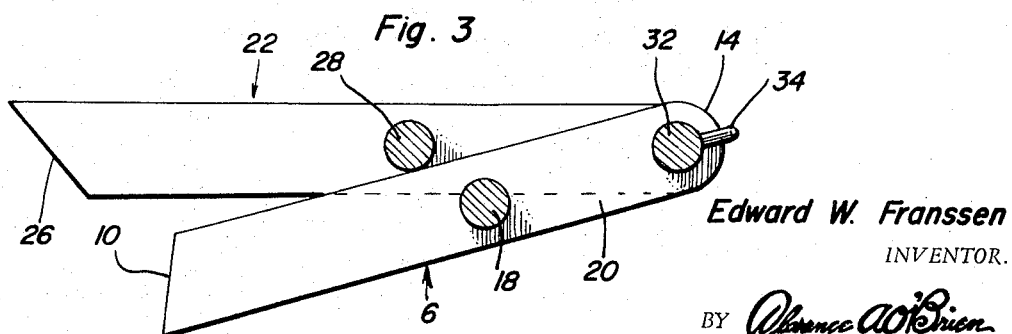

3,341,159
HOSE STAND
Edward W. Franssen, 2401 S. 9th St.,
Lincoln, Nebr. 68502
Filed Sept. 30, 1965, Ser. No. 491,577
5 Claims. (Cl. 248—83)

ABSTRACT OF THE DISCLOSURE

The inverted V-shaped hose stand shown is self-standing and comprises a pair of foldable H-shaped leg frames whose upper ends are hinged together. The stout rungs between the median portions of the legs serve to bend, support and direct the nozzle-equipped end of the garden hose. A chain has a collar at the lower end surrounding the hose. The upper end of the chain provides links which are adjustably and releasably joined to a lug-like keeper pin fixed on a median portion of the frame hinging rung.

---

The present invention relates to a portable elevating and supporting stand for the nozzle-equipped end portion of a conventional-type garden hose. Briefly, the invention is characterized by a portable self-standing hose elevating and supporting stand. The stand is structurally and functionally unique in that it comprises two leg frames which have cooperating upper ends pivotally or hingedly joined together and which are capable of being set up in inverted V-shaped relationship or collapsed and folded together for compactness and convenience when being carried or stored.

In carrying out the preferred embodiment of the invention each leg frame is substantially H-shaped in elevation and comprises a pair of spaced parallel legs the lower ends of which are suitably mitered to rest atop a lawn or other ground surface. The upper ends of the legs of the respective frames are overlapped and hingedly connected together. The median portion of each frame is provided with a dowel-like brace or rung whereby when the stand is set up the rungs are in prescribed height relationship and in fact substantially in a common plane to permit bendable portions of the customary rubber or equivalent garden hose to be threaded over and under the rungs and through the space between the ladder-like frames to thus coordinate the hose and said frames and to permit the nozzle on the free end to be aimed in a direction to direct the stream of water where needed or wanted as the case may be.

In addition to the feature of threading over and under the rungs and placing the hose-end under tension, means is provided for lifting and angling the nozzle-equipped end, preferably a hoisting and lowering chain which is collared in place on the hose-end and wherein links at the upper end of the chain can be adjustably connected with an anchoring and retaining pin or stud at the upper apical or vertex end of the inverted V-stand.

A general objective of the concept is to structurally, functionally and in other practical ways improve upon portable and collapsible hose stands, racks, jacks and the like by providing one which is simple, practical, economical, strong and reliable and in many other ways capable of attaining the improved end result desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a garden hose stand constructed in accordance with the present invention and showing how it is constructed, set up for use and how by adjustment the spray nozzle can be angled and aimed to achieve the watering result desired;

FIGURE 2 is an enlarged view taken approximately on the plane of the section line 2—2 of FIGURE 1; and FIGURE 3 is a view in section similar to FIGURE 2 with the frames folded for storage and with the hose omitted.

Referring now to the views of the drawing it will be noted that when the frame structure is set up for use it provides a self-supporting hose stand. The component parts or units can be made of wood, plastic or lightweight substantially non-corrodible metal. The stand is characterized by a first relatively narrow as well as relatively short leg frame distinguished as the first leg frame 6. This frame comprises a pair of duplicate spaced parallel rails or legs 8 whose lower ends are suitably mitered as at 10 to rest firmly atop the lawn or other support surface 12 as best shown in FIG. 2. The upper end portions of the two legs are suitably rounded as at 14 and provided with registering apertures or holes 16. The median portions of the legs support a horizontal cross brace, more particularly, a circular round or rung 18. Thus the upper portions 20 of the legs extend above the level of the rung 18. The slightly longer ladder-like leg frame is denoted by the numeral 22 and it is basically the same in construction as the one already described in that it is characterized by a pair of opposed spaced parallel duplicate legs or uprights 24 whose lower ends are mitered or oblique angled as at 26 to rest on the support surface. The median portions of the legs support a cross brace which comprises a rung 28 which corresponds in size and shape with the rung 18. The upper rounded end portions 30 of these legs overlap the rounded ends 14 of the first-named legs and the respectively rounded or terminal end portions are joined together by a hinge pin 32 which is fixed to one frame with the other frame pivoting or hinging thereon. In fact, this hinge pin is similar to the rungs 18 and 28 but its function is different and in addition it is provided intermediate its ends with a rigid upstanding chain anchoring stud 34 to accommodate one of the end links 36 of a connecting and adjusting chain 38 which is joined at its lower end 40 to an eye or lug 42 on a collar 44.

In keeping with the principles of the invention the collar 44 is such in design and construction that it will be made to fit on and encircle the terminal end portion of a conventional garden hose 46. More specifically the collar is arranged inwardly of the terminal spray nozzle 48. The chain-equipped hose can then be threaded and saddled in place in the manner shown that is with one portion 58 bent over the rung 28, the terminal end portion 60 bent under the rung 18, and the in-between portion 62 spanning the space between the first and second leg frames 6 and 22, respectively.

As is evident, when the bendable end portion of the hose is cradled in place the inherent tension resulting from the bends 58 and 60 would tend to exert downward pressure on the nozzle and thus point it downwardly (not shown) toward the lawn or other surface. However, when the chain is properly adjusted it will be seen that the upward pull exerted on the nozzle-equipped end will not only adjust and aim the nozzle, the strain thus engendered will assist in retaining the parts of the stand, the hose and other components in coacting relationship. It follows that all significant components or parts contribute their individual functions to the overall innovation when it is being used in the manner shown in FIGS. 1 and 2. In addition, the stand has the capability of functioning when in use as illustrated and also functioning in compact and convenient folded relationship when not in use as illustrated in FIGURE 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a conventional garden hose having the customary flexible and resilient properties, and a portable foldable hose-end supporting nozzle aiming stand comprising a first H-shaped leg frame embodying a pair of duplicate oppositely disposed spaced parallel legs having corresponding median portions joined by a rigid integrally mounted rung, a second H-shaped leg frame complemental to said first leg frame basically the same in construction as said first-named frame and likewise embodying a pair of duplicate oppositely spaced parallel legs having median portions bridged and joined by a rigid integrally mounted rung, the upper ends of the legs of the frames being overlapped and hinged together, said leg frames being spread apart and disposed in outwardly downwardly divergent relation with the lower ends of the legs suitably mitered and resting on a support surface, for example, a lawn surface, a portion of said hose-end being threaded between the legs of said leg frames and being bent over the rung of one leg frame and tensioned and bent under the rung of the other leg frame with a terminal end projecting beyond the latter rung and provided with a spray nozzle, and manually regulable means separably connecting said nozzle-equipped terminal end to an upper part of said stand.

2. The structure according to claim 1, and wherein said rungs are circular in cross-section and otherwise alike in construction and are so located between their respective legs that are in a substantially common plane when in use.

3. The structure according to claim 1, and wherein said connecting means comprises a chain adjustably linking said hose-end with the means hingedly joining the aforementioned upper ends of said legs.

4. In combination, a conventional garden hose having the customary flexible and resilient properties, and a portable foldable hose-end supporting nozzle aiming stand comprising a first H-shaped leg frame embodying a pair of duplicate oppositely disposed spaced parallel legs having corresponding median portions joined by a rigid integrally mounted rung, a second H-shaped leg frame complemental to said first leg frame, basically the same in construtcion as said first-named frame and likewise embodying a pair of duplicate oppositely spaced parallel legs having median portions bridged and joined by a rigid integrally mounted rung, said second H-shaped leg frame being of a width greater than the width of the first-named frame and the upper ends of the legs thereof overlapping corresponding upper ends of the legs of the first frame, a hinge pin passing through and carried by the upper ends of the legs of the respective leg frames and pivotally connecting said legs and permitting the same to be folded together in compact form when not in use and spread out into diverging relationship when in use to thus provide an inverted V-shaped stand, said hinge pin being provided centrally with a fixed upstanding stud constituting a keeper pin, a portion of said hose-end being threaded between the legs of the respective leg frames, a portion being bent over the rung of one leg frame and placed under tension and under the rung of the other leg frame and further tensioned with a terminal end of the hose projecting beyond the latter rung and equipped with a spray nozzle, a collar embracing and carried by the projecting end of the hose-end, and a chain having one end fixed to said collar and having the other end provided with freely usable links, said links detachably and adjustably connectible with said keeper pin.

5. For use in supporting the nozzle-equipped end of a conventional garden hose, a folding inverted V-shaped hose stand comprising a first vertically elongated H-shaped leg frame embodying a pair of duplicate oppositely disposed spaced parallel legs, a rung; interposed between and connected at its ends with median portions of the respective legs, said rung being rigid and adapted to seat and support a portion of said garden hose, a second H-shaped leg frame complemental to said first-named leg frame and embodying a pair of duplicate oppositely disposed spaced parallel legs, a second rung interposed between and connected at its ends with median portions of said last-named legs, the legs of the respective frames having corresponding rounded upper ends terminating in a common plane, overlapped and connected by an assembling and hinging round, said round being provided intermediate its ends with a radial upstanding lug, said lug constituting a keeper pin and a chain having links at an upper end detachably and selectively connectible with said keeper pin, and a collar at its lower end which is designed and adapted to embrace and suspend the nozzle-equipped end of said hose.

References Cited
UNITED STATES PATENTS

| | | | |
|---|---|---|---|
| 782,461 | 2/1905 | Parker | 248—86 |
| 1,016,281 | 2/1912 | Lundquist | 248—83 |
| 1,711,585 | 5/1929 | Brunhoff | 248—196 |
| 2,299,629 | 10/1942 | Jordan | 248—83 |

ROY D. FRAZIER, *Primary Examiner.*

CHANCELLOR E. HARRIS, *Examiner.*

J. F. FOSS, *Assistant Examiner.*